US008351849B2

(12) United States Patent
Ying (10) Patent No.: US 8,351,849 B2
(45) Date of Patent: Jan. 8, 2013

(54) MULTI-STANDARD WIRELESS TERMINALS INCLUDING SMART ANTENNA SYSTEMS FOR MULTIPLE INPUT MULTIPLE OUTPUT COMMUNICATIONS

(75) Inventor: Zhinong Ying, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 117 days.

(21) Appl. No.: 12/861,324

(22) Filed: Aug. 23, 2010

(65) Prior Publication Data

US 2012/0046003 A1   Feb. 23, 2012

(51) Int. Cl.
*H04B 7/185* (2006.01)
*H04M 1/00* (2006.01)

(52) U.S. Cl. .............. 455/13.3; 455/127.4; 455/552.1; 343/729; 343/751; 343/853

(58) Field of Classification Search .......... 455/13.3, 455/19, 25, 63.4, 82, 83, 562.1, 121, 129, 455/193.1, 575.7, 426.1, 127.4, 552.1, 435.2, 455/553.1; 343/824, 726, 729, 751, 835, 343/844, 853, 855, 879, 893; 342/403, 406, 342/423, 430, 434, 437, 445–447
See application file for complete search history.

(56) References Cited

U.S. PATENT DOCUMENTS

| | | | |
|---|---|---|---|
| 5,276,914 A * | 1/1994 | Ishizuka et al. ............ | 455/83 |
| 6,748,246 B1 * | 6/2004 | Khullar ................... | 455/574 |
| 6,947,716 B2 | 9/2005 | Ono | |
| 7,315,733 B2 | 1/2008 | Ohsuge | |
| 2008/0106476 A1 * | 5/2008 | Tran et al. ............... | 343/702 |
| 2009/0046768 A1 * | 2/2009 | Pare, Jr. .................. | 375/220 |
| 2010/0042881 A1 * | 2/2010 | Wong ..................... | 714/748 |
| 2010/0113090 A1 * | 5/2010 | Lin et al. ................ | 455/553.1 |
| 2010/0117913 A1 * | 5/2010 | Jung ..................... | 343/724 |
| 2010/0197272 A1 * | 8/2010 | Karaoguz et al. ......... | 455/411 |
| 2010/0279709 A1 | 11/2010 | Shahidi et al. | |
| 2011/0188552 A1 * | 8/2011 | Yoon et al. .............. | 375/219 |

FOREIGN PATENT DOCUMENTS

| WO | WO 2007/068087 A1 | 6/2007 |
|---|---|---|
| WO | WO 2009/039435 A1 | 3/2009 |

OTHER PUBLICATIONS

European Search Report Corresponding to European Application No. 11174827.3; Dated: Dec. 2, 2011; 6 pages.

* cited by examiner

*Primary Examiner* — Dominic E Rego
(74) *Attorney, Agent, or Firm* — Myers Bigel Sibley & Sajovec, P.A.

(57) ABSTRACT

A wireless communication device includes a transceiver configured for communication using multiple radio access technologies. An antenna array is coupled to the transceiver, and includes a first antenna element and a second antenna element. A control circuit is operable to detect an available one of the radio access technologies based on a wireless signal received at the antenna array, and is operable to automatically alter a configuration of the antenna array by switching the first and/or second antenna elements between active and inactive states responsive to detection of the available one of the radio access technologies. Related methods of operation are also discussed.

18 Claims, 4 Drawing Sheets

MULTI-STANDARD WIRELESS TERMINALS INCLUDING SMART ANTENNA SYSTEMS FOR MULTIPLE INPUT MULTIPLE OUTPUT COMMUNICATIONS

FIELD OF THE INVENTION

The present invention relates to antennas for wireless communications, and in particular relates to wireless communication terminals including at least primary and secondary antennas.

BACKGROUND

Wireless communication channels suffer from fading, or loss of signal, due to changes in the propagation environment of the wireless signal. Some types of fading, such as Rayleigh fading, can be highly localized in nature. Furthermore, wireless communication systems are often limited in the amount bandwidth that can be used, due to practical restrictions on the electronics that are used, or due to licensing and regulatory restrictions.

The performance of wireless communications may depend on antenna systems, also known as smart or intelligent antennas. Recently, multiple antenna technologies have emerged to achieve the goal of 4G systems such as high rate, high reliability, and long range communications. For example, multiple-input and multiple-output, or MIMO, refers to the use of multiple antennas at the transmitter and the receiver end of a wireless link. MIMO technology may offer significant increases in data throughput and/or transmission range without the need for additional bandwidth or transmit power. It can achieve this due to the ability of MIMO to obtain higher spectral efficiency (more bits per second per hertz of bandwidth), link reliability, and/or reduced fading.

MIMO based systems may allow the use of a variety of coding techniques that take advantage of the presence of multiple transmit and receive antennas. For example, wireless communications performed over a MIMO channel can use beamforming, spatial multiplexing and/or diversity coding techniques.

Beamforming involves transmitting the same signal on each of the transmit antennas with appropriate complex (i.e., gain and phase) weighting such that the signal power is increased at the receiver input. The benefits of beamforming may include increased signal gain from constructive interference and reduced multipath fading.

In spatial multiplexing, a high data rate signal is split into multiple lower data rate streams, and each stream is transmitted from a different transmit antenna in the same frequency channel. The receiver separates the received streams and combines the received data streams into a single receive stream, thereby increasing channel capacity.

In diversity coding methods, a single stream is transmitted, but the signal is coded using space-time coding techniques so that the signal emitted from each of the transmit antennas is substantially orthogonal. Diversity coding exploits the independent fading in the multiple antenna links to enhance signal diversity.

To increase performance of a MIMO system, it is desirable for fading on the wireless links between the transmit and receive antennas to be uncorrelated. That is, it is desirable for there to be a low statistical correlation between fading experienced at one antenna and fading experienced at another antenna.

Correlation between antennas can be reduced by causing the antennas to have different polarizations, i.e. sending and receiving signals with orthogonal polarizations. Furthermore, antennas for MIMO systems may utilize spatial separation, or physical separation, to reduce correlation between antennas. Either of these approaches can be unsatisfactory for handheld mobile devices, however, as it is generally desirable for the handheld devices to have compact antennas.

SUMMARY

A wireless communication device according to some embodiments include a transceiver configured for communication using multiple radio access technologies, and an antenna array coupled to the transceiver. The transceiver includes a transmitter and a receiver. The antenna array includes a first antenna element and a second antenna element. A control circuit is operable to detect an available one of the radio access technologies based on a wireless signal received at the antenna array, and is operable to automatically alter a configuration of the antenna array by switching the first and/or second antenna elements between active and inactive states responsive to detection of the available one of the radio access technologies.

In some embodiments, the control circuit may include a detector circuit and a switching circuit. The detector circuit may be configured to detect the available one of the radio access technologies based on the received wireless signal and output a selection signal indicative thereof. The switching circuit may be operable to selectively connect the first and/or second antenna elements to the transceiver responsive to the selection signal to increase an efficiency of the antenna array for the available one of the radio access technologies.

In some embodiments, the switching circuit may be operable to automatically disconnect the second antenna element from the transceiver to increase the efficiency of the antenna array responsive to detection of the available one of the radio access technologies as not supporting multiple-output (MIMO). In some embodiments, the switching circuit may be operable to automatically switch the second antenna element to an open-circuit state responsive to detection of the available one of the radio access technologies as not being configured to support MIMO. In some embodiments, the switching circuit may be operable to automatically switch the second antenna element to a grounded state responsive to detection of the available one of the radio access technologies as not being configured to support MIMO.

In some embodiments, the available one of the radio access technologies may be Global Standard for Mobile (GSM) and/or Universal Mobile Telecommunications System (UMTS).

In some embodiments, the switching circuit may be configured to automatically disconnect one of the first and second antenna elements from the transceiver and connect the other of the first and second antenna elements to the transceiver responsive to detection of hand loading and/or signal fading at the one of the first and second antenna elements.

In some embodiments, the switching circuit may be configured to automatically connect the first and second antenna elements to a common feed point to increase the efficiency of the antenna array responsive to detection of the available one of the radio access technologies as not supporting multiple-input multiple-output (MIMO).

In some embodiments, the switching circuit is configured to automatically connect each of the first and second antenna elements to the transceiver responsive to detection of the available one of the radio access technologies as supporting multiple-input multiple-output (MIMO).

In some embodiments, the device may further include a decoupling and matching circuit. The switching circuit may be configured to automatically connect the second antenna element to the transceiver via the decoupling and matching circuit responsive to detection of the available one of the radio access technologies as being a Long-Term Evolution (LTE)-compatible technology.

In some embodiments, the detector circuit may be configured to detect multiple available ones of the radio access technologies based on respective wireless signals received at the antenna array. The detector circuit may further include a selector circuit operable to select one of the available ones of the radio access technologies and output the selection signal indicative thereof. The switching circuit may be operable to selectively connect the first and/or second antenna elements to the transceiver responsive to the selection signal to increase the efficiency of the antenna array for the selected one of the available ones of the radio access technologies and to reduce an efficiency of the antenna array for another of the available ones of the radio access technologies.

In some embodiments, a first one of the respective wireless signals corresponding to the selected one of the available ones of the radio access technologies may be a weaker signal than a second one of the respective wireless signals. The detector circuit may be further configured to detect a subsequent signal strength of the first one of the respective wireless signals responsive to selectively connecting the first and/or second antenna elements to the transceiver. The selector circuit may be configured to select a different one of the available ones of the radio access technologies responsive to the signal strength being below a desired threshold, and to output a subsequent selection signal indicative thereof. The switching circuit may be configured to further alter the configuration of the antenna array responsive to the subsequent selection signal to increase an efficiency of the antenna array for the different one of the available ones of the radio access technologies.

In some embodiments, the first and second antenna elements may be mounted at opposite sides of the wireless communication device.

In some embodiments, the first and second antenna elements may be mounted on a same side of the wireless communication device with a gap therebetween.

According to further embodiments of the present invention, a method of operating an antenna system for communication using multiple radio access technologies includes receiving, at an antenna array including a plurality of antenna elements, a wireless communication signal. An available one of the radio access technologies is detected responsive to receiving the wireless communication signal at the antenna array. A configuration of the antenna array is automatically altered by switching at least one of the plurality of antenna elements between active and inactive states responsive to detecting the available one of the radio access technologies.

In some embodiments, the plurality of antenna elements may include first and second fixed antenna elements. A selection signal indicative of the available one of the radio access technologies may be provided responsive to detecting the available one of the radio access technologies. The first and/or second antenna elements may be selectively connected to a wireless transceiver configured for communication using the multiple radio access technologies responsive to the selection signal to increase an efficiency of the antenna array for the available one of the radio access technologies.

In some embodiments, the second antenna element may be automatically disconnected from the transceiver to increase the efficiency of the antenna array responsive to detecting the available one of the radio access technologies as not supporting multiple-output (MIMO).

In some embodiments, hand loading and/or signal fading may be detected at one of the first and second antenna elements. Responsive to detection of the hand loading and/or signal fading at the one of the first and second antenna elements, the one of the first and second antenna elements may be automatically disconnected from the transceiver, and the other of the first and second antenna elements may be automatically connected to the transceiver.

In some embodiments, the first and second antenna elements may be automatically connected to a common feed point to increase the efficiency of the antenna array responsive to detecting the available one of the radio access technologies as not supporting multiple-input multiple-output (MIMO).

In some embodiments, each of the first and second antenna elements may be automatically connected to the transceiver responsive to detecting the available one of the radio access technologies as supporting multiple-input multiple-output (MIMO).

Other methods, systems, and/or devices according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As used herein, a "wireless communication device" includes, but is not limited to, a device that is configured to receive/transmit communication signals via a wireless interface with, for example, a cellular network, a wireless local area network (WLAN), a digital television network such as a DVB-H network, a satellite network, an AM/FM broadcast transmitter, and/or another communication terminal. A wireless communication device may be referred to as a "wireless communication terminal," a "wireless terminal" and/or a "mobile terminal." Examples of wireless communication devices include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radio transceiver, including WLAN routers and the like.

For purposes of illustration and explanation only, various embodiments of the present invention are described herein in the context of a wireless communication device that includes a MIMO antenna that is configured to transmit and/or receive RF signals in two or more frequency bands. The MIMO antenna may be configured, for example, to transmit/receive RF communication signals in the frequency ranges used for cellular communications (e.g., cellular voice and/or data communications), WLAN communications, and/or Transfer-Jet communications, etc.

As used herein, the "efficiency" of an antenna element or array may refer to the ratio of the total radiated power to the total input power, where the total radiated power is based on the total input power less losses (for example, due to coupling, correlation, and/or dissipation). In contrast, the link spectral efficiency of a digital communication system refers to the net bitrate or maximum throughput divided by the bandwidth in hertz of a communication channel or a data link, as measured in bit/s/Hz, or (bit/s)/Hz.

Wireless communication between electronic devices may be accomplished using a wide variety of communication media, communication systems and communication standards. For example, mobile terminals such as wireless mobile telephones are typically configured to communicate via analog and/or digital wireless radio frequency (RF) telephone systems. Such devices may additionally be configured to communicate using wired and/or wireless local area networks (LANs), short range communication channels, such as Bluetooth RF communication channels and/or infrared communication channels, and/or long range communication systems, such as satellite communication systems. Mobile terminals may increasingly include more than one antenna element, for example, due to requirements for multiple-input-multiple-output (MIMO) communications, diversity, multi-band compatibility, and/or multi-system compatibility.

Some embodiments of the present invention arise from a realization that performance may suffer in mobile terminals and/or other portable wireless communication devices including more than one antenna element due, for example, to mutual coupling, correlation, and/or material losses. For example, in a LTE (Long Term Evolution) or HSPA (High Speed Packet Access) multi-antenna terminal or dongle, having multiple antennas may improve performance in some communication modes, but may result in mutual coupling losses in other communication modes.

To address these and other issues, embodiments of the present invention provide a switchable or reconfigurable "smart" antenna array including multiple antenna elements, where one or more of the antenna elements may be selectively switched to an inactive state (e.g., by switching one or more of the antenna elements to an open state or a grounded state) based on the available wireless communication or radio access technologies. For example, correlation and/or coupling could be reduced by switching to a localized mode antenna to provide different radiation patterns. In addition, some communication standards may require only one antenna, so switching off or decoupling the remaining antenna(s) may improve over-the-air (OTA) performance. Moreover, in cases where the mobile terminal is worn and/or otherwise in contact with the body of the user, selectively switching between one or more active antenna elements may improve the OTA performance and/or the specific absorption rate (SAR). Switching between antenna elements may be implemented by software control in some embodiments. Accordingly, reconfigurable smart antenna systems in accordance with embodiments of the present invention may enhance the performance of a mobile terminal and/or other portable wireless communication device when used in different communication systems.

Figure 1:
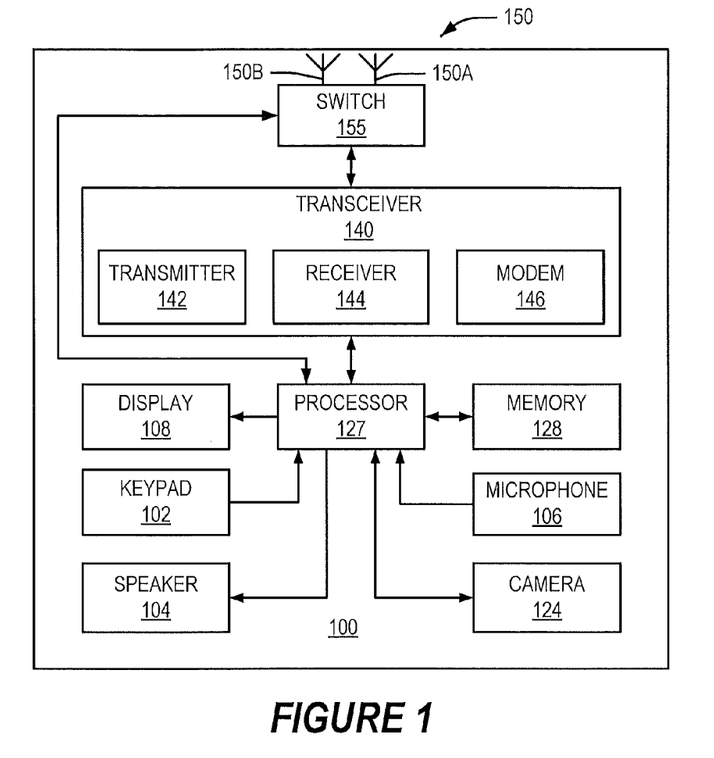
FIG. 1 is a block diagram of a wireless communication device and methods of operation according to some embodiments of the present invention.

A wireless communication device 100 according to some embodiments is illustrated in FIG. 1. The wireless communication device 100 is configured to transmit and/or receive wireless signals over multiple wireless communication interfaces. For example, a wireless communication device 100 according to some embodiments can include a cellular communication module, a Bluetooth module, an infrared communication module, a global positioning system (GPS) module, a WLAN module, and/or other types of communication modules.

With a cellular communication module, the wireless communication device 100 can communicate using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, Universal Mobile Telecommunications System (UMTS), and 3GPP LTE (3rd Generation Partnership Project Long Term Evolution).

With a Bluetooth or infrared module, the wireless communication device 100 can communicate via an ad-hoc network using a direct wireless interface. With a WLAN module, the wireless communication device 100 can communicate through a WLAN router using a communication protocol that may include, but is not limited to, 802.11a, 802.11b, 802.11e, 802.11g, and/or 802.11i.

In particular, the wireless communication device 100 includes a display 108, such as a liquid crystal display (LCD) and/or an organic light emitting diode (OLED) display. The wireless communication device 100 may optionally include a keypad 102 or other user input mechanism on the front housing 110 of the device 100. In some embodiments, the display 108 may be provided with touchscreen capability to replace and/or supplement the keypad 102.

The wireless communication device 100 may include a microphone 106 and an earphone/speaker 104. The front housing 110 may be designed to form an acoustic seal to the user's ear when the earphone/speaker 104 is placed against the user's head.

The keypad 102, display 108, microphone 106, speaker 104 and camera 124 may be coupled to a processor 127, such as a microprocessor or microcontroller, which may be configured to control operations of the wireless communication device 100. The wireless communication device 100 may further include a transceiver 140 and a memory 128 coupled to the processor 127. Other electronic circuitry, such as a WLAN communication interface, a Bluetooth interface, a GPS interface, a digital signal processor, etc., may also be included in the electronic circuitry of the device 100.

The memory 128 may be a general purpose memory that is used to store both program instructions for the processor 127 as well as data, such as audio data, video data, configuration data, and/or other data that may be accessed and/or used by the processor 127. The memory 128 may include a nonvolatile read/write memory, a read-only memory and/or a volatile read/write memory. In particular, the memory 128 may include a read-only memory in which basic operating system instructions are stored, a non-volatile read/write memory in which re-usable data, such as configuration information, directory information, and other information may be stored, as well as a volatile read/write memory, in which short-term instructions and/or temporary data may be stored.

The transceiver 140 typically includes a transmitter circuit 142, a receiver circuit 144, and a modem 146, which cooperate to transmit and receive radio frequency signals to remote transceivers via an antenna array 150. The radio frequency signals transmitted between the device 100 and the remote transceivers may comprise both traffic and control signals (e.g., paging signals/messages for incoming calls), which are used to establish and maintain communication with another party or destination. More particularly, the transceiver 140, in operational cooperation with the processor 127, may be configured for communication according to multiple radio access technologies. The radio access technologies may include, but are not limited to, WLAN (e.g., 802.11), WiMAX (Worldwide Interoperability for Microwave Access), 3GPP LTE (3rd Generation Partnership Project Long Term Evolution), Universal Mobile Telecommunications System (UMTS), Global Standard for Mobile (GSM) communication, General Packet Radio Service (GPRS), enhanced data rates for GSM evolution (EDGE), DCS, PDC, PCS, code division multiple access (CDMA), wideband-CDMA, and/or CDMA2000. Other radio access technologies and/or frequency bands can also be used in embodiments according to the invention.

The antenna array 150 is coupled to the transceiver 140 and includes a plurality of antenna elements, illustrated as a first or primary antenna 150A and a second or secondary antenna 150B. However, the antenna array 150 can include more than two antenna elements 150A, 150B in some embodiments. A switching circuit 155 is operable to provide separate communication paths for supplying/receiving RF signals to different radiating elements of the antenna 150 via respective RF feeds. Accordingly, when the antenna array 150 includes two antenna elements 150A, 150B, such as shown in FIG. 1, the switch 155 may provide separate communication circuits to each of the antenna elements 150A, 150B.

Based on a wireless signal received at the antenna array 150, the processor 127 is operable to detect and select an available one of the multiple radio access technologies supported by the transceiver 140 and automatically alter a configuration of the antenna array 150 in response thereto to provide respective antenna configurations that are compatible with different radio access technologies. In particular, the processor 127 may operate the transceiver 140 and the antenna array 150 to scan for available radio frequency signals and perform handshaking operations with one or more respective base stations. Each base station may thereby transmit a respective wireless signal indicating the availability of a corresponding radio access technology. The respective wireless signals may be received at the antenna array 150, and the processor 127 may detect and select one of the available radio access technologies and adaptively adjust the configuration of the antenna array 150 accordingly via the switching circuit 155. Thus, as described in greater detail below, the processor 127 and the switching circuit 155 provide a control circuit that is configured to selectively switch the first antenna element 150A and/or the second antenna element 150B between active and inactive states to alter the radiation pattern of the array and thereby increase antenna efficiency for the selected one of the available radio access technologies.

Figure 2A:
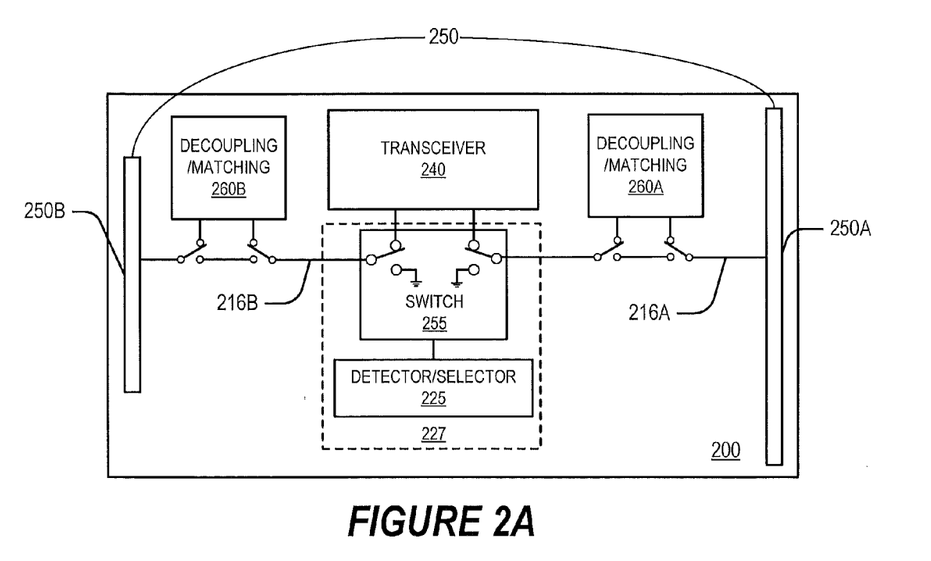
FIGS. 2A-2B illustrate example configurations of antenna arrays in wireless communication devices and methods of operation according to some embodiments of the present invention.

FIG. 2A illustrates an example configuration of an antenna array in a wireless communication device according to some embodiments. In particular, as shown in FIG. 2A, an antenna array 250 includes two antenna elements 250A and 250B provided in fixed positions at opposite sides of a wireless communication device 200. In particular, the first antenna element 250A is a monopole antenna used as a primary antenna for the wireless communication device 200, and the second antenna element 250B is a microstrip patch antenna, such as a planar inverted F antenna (PIFA), used as a secondary antenna for the device 200. A switching circuit 255 (illustrated as including single pole, double throw switches) provides separate communication paths for supplying/receiving RF signals to the antennas 250A, 250B via respective RF feeds 216A, 216B. More particularly, the switch 255 is operable to connect each of the antennas 250A, 250B to the transceiver 240 via respective communication paths, or to selectively switch one of the antennas 250A, 250B to a grounded state, thereby disconnecting it from a transceiver 240, depending on the selected radio access technology.

Figure 2B:
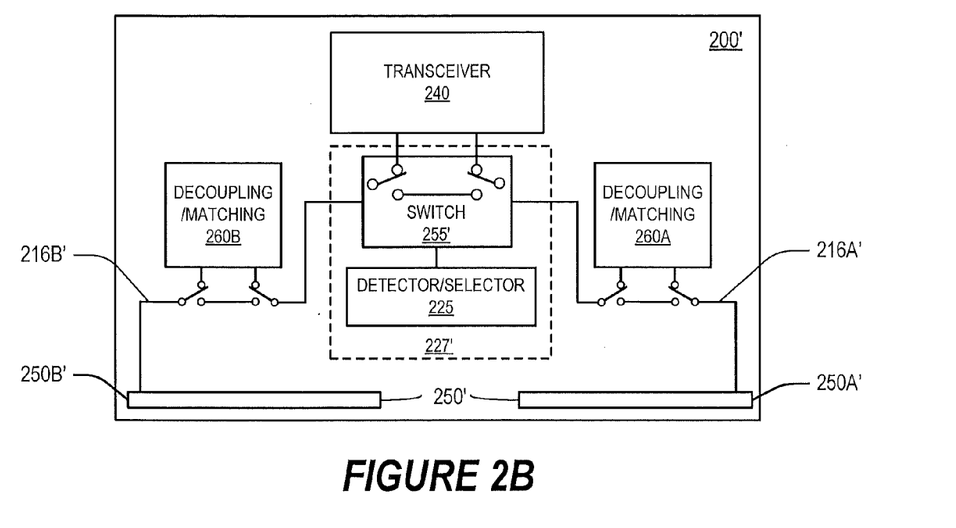

FIG. 2B illustrates another example configuration of an antenna array in a wireless communication device according to some embodiments. In particular, as shown in FIG. 2B, an antenna array 250' includes two fixed antenna elements 250A' and 250B' provided in fixed positions at the same side of a wireless communication device 200'. In particular, the first antenna element 250A' and the second antenna element 250B' are provided by respective inverted F antennas (IFAs) spaced apart from one another along a length of the wireless communication device 200'. The spacing between the first antenna element 250A' and the second antenna element 250B' may be sufficient to prevent shorting of the two antenna elements 250A', 250B'. A switching circuit 255' (illustrated as including single pole, double throw switches) provides separate communication paths for supplying/receiving RF signals to the antenna elements 250A', 250B' via respective RF feeds 216A', 216B'. More particularly, the switch 255' is operable to connect each of the antenna elements 250A', 250B' to the transceiver 240 via respective communication paths, or to selectively switch one of the antenna elements 250A', 250B' to an open state, based on the particular radio access technology being used.

Referring now to FIGS. 2A and 2B, the wireless communication devices 200 and 200' each include a transceiver 240 that is configured for communication using multiple radio access technologies, and a detector/selector circuit 225. The detector/selector circuit 225 is configured to detect one or more available ones of the radio technologies based on respective wireless signals received at the respective antenna arrays 250 and 250', select one of the available radio access technologies for wireless communication, and output a selection signal to the respective switches 255 and 255' indicating the selected one of the available radio access technologies. For example, the detector/selector circuit 225 may detect a number of radio access technologies, such as second-generation (2G), third-generation (3G), and fourth-generation (4G) wireless telephone technologies, that are available for use by the transceiver 240 in a particular area based on wireless signals received at the antenna arrays 250 and 250'. In some embodiments, the detector/selector circuit 225 may be configured to preferentially select one of the available radio access technologies providing a highest bandwidth or access speed. For example, the detector/selector 225 may be configured to select an access technology that supports multiple-input and multiple-output (MIMO), such that multiple antennas may be usable simultaneously. MIMO refers to the use of multiple antennas at the transmitter and the receiver end of a wireless link. As such, the antenna elements 250A/250B and/or 250A'/250B' may be used with beamforming, spatial multiplexing, and/or diversity coding methods responsive to the selection signal provided by the detector/selector circuit 225.

The switches 255 and 255' are configured to alter the configuration of the antenna arrays 250 and 250', respectively, in response to the selection signal output by the detector/selector circuit 225 to provide an antenna configuration that is compatible with and/or optimized for the selected access technology. As such, the detector/selector circuit 225 and the switches 255 and 255' define respective control circuits 227 and 227' configured to alter the antenna arrays 250 and 250' to provide respective configurations that may improve antenna performance for a selected radio access technology. In particular, as similarly discussed above with reference to the processor 127 of FIG. 1, the control circuit 227 of FIG. 2A may operate the transceiver 240 and the antenna array 250 to scan for available radio frequency signals and perform handshaking operations with one or more respective base stations. In response, each base station may transmit a respective wireless signal indicating the availability of a corresponding radio access technology. The respective wireless signals may be received at the antenna array 250, and the control circuit 227 may detect and select one of the available radio access technologies and adaptively adjust the configuration of the antenna array 250 accordingly via the switching circuit 255. The control circuit 227' of FIG. 2B may operate in a similar manner with respect to the antenna array 250' and the switching circuit 255'. Embodiments of the present invention as illustrated in FIGS. 2A-2B may thereby provide the following antenna configurations for different radio access technologies.

When LTE is detected as an available access technology by the detector/selector circuit 225, the switch 255 automatically connects both the primary antenna 250A and the secondary antenna 250B to the transceiver 240 to provide MIMO capability. The switch 255' similarly automatically connects both the first antenna element 250A' and the second antenna element 250B' to the transceiver 240 responsive to detection of the availability of LTE by the detector/selector circuit 225'. The antenna elements 250B and 250B' may also be connected to the transceiver 240 via a decoupling and matching circuit 260B responsive to detection of the availability of LTE (or other radio access technology that supports MIMO) to further reduce coupling and correlation, providing improved antenna performance and/or efficiency. The antenna elements 250A and 250A' may also be connected to the transceiver 240 via a decoupling and matching circuit 260A.

When GSM or UMTS is selected as an available access technology by the detector/selector circuit 225 (for example, due to the unavailability of LTE), the switch 255 automatically disconnects the secondary antenna 250B from the transceiver 240, and connects the secondary antenna to a ground plane. Likewise, the switch 255' automatically disconnects the second antenna element 250B' from the transceiver 240, leaving the second antenna element 250B' open responsive to detection of the availability of GSM or UMTS by the detector/selector circuit 225'. Accordingly, by providing the antennas 250B and 250B' in a grounded state and an open state, respectively, mutual coupling losses of the antennas 250A and 250A' may be reduced, thereby improving an efficiency of the antenna arrays 250 and 250' when using radio access technologies that do not support MIMO. In particular, in handheld or other small wireless communication devices using a compact MIMO antenna, the single antenna efficiency may be reduced by about 1 dB to about 3 dB due to strong mutual coupling between the multiple antenna elements. Accordingly, by selectively disconnecting the antenna elements 250B and 250B' when using radio access technologies where multiple antennas are not simultaneously usable by the transceiver 240, antenna efficiency may be improved by about 1 dB to about 3 dB in some embodiments.

In addition, embodiments of the present invention as illustrated in FIGS. 2A-2B may provide diversity operation, which may be used to reduce hand effects and/or signal fading. In particular, when GSM, UMTS, or other available radio access technology that does not support MIMO is selected by the detector/selector circuit 225, the switch 255 selectively disconnects and grounds either the primary antenna 250A or the secondary antenna 250B, depending on which of the antennas 250A, 250B is experiencing greater hand loading and/or signal fading. The switch 255' similarly selectively disconnects either the first antenna element 250A' or the second antenna element 250B', leaving the disconnected antenna element in an open state, responsive to selection of a radio access technology that does not support MIMO and depending on which of the antenna elements 250A', 250B' is experiencing greater hand loading and/or signal fading.

Embodiments of the present invention as illustrated in FIG. 2B may also provide a common feed point mode when an available radio access technology that does not support MIMO is selected by the detector/selector circuit 225'. In particular, the switch 255' automatically connects both the first antenna element 250A' and the second antenna element 250B' to a common feed point, thereby distributing power to both antenna elements 250A', 250B', which may lower SAR, reduce hand effects, and thereby improve antenna efficiency when the selected radio access technology does not allow for separate transmission/reception by each of the antenna elements 250A', 250B' simultaneously.

In some embodiments, the detector/selector circuit 225 may be configured to select one of the available the radio access technologies independent of a signal strength of the corresponding wireless signal received at the antenna array (e.g., even if the signal strength of the corresponding wireless signal is weaker than those of wireless signals corresponding to other ones of the available radio access technologies). For example, in an area where the received signal strength of a 4G wireless signal is weaker than that of a 3G wireless signal, the detector/selector circuit 225 may nevertheless select the weaker 4G signal and reconfigure the antenna array 250 or 250' to improve reception thereof. Thus, the detector/selector circuit 225 may select a preferred radio access technology despite a weaker signal strength, and may activate the switches 255 and/or 255' to attempt to increase an efficiency of the antenna arrays 250 and/or 250' for the weaker signal.

The detector/selector circuit 225 may be further configured to detect a subsequent signal strength of the corresponding wireless signal after altering the configuration of the antenna arrays 250 and/or 250', and to select a different one of the available radio access technologies responsive to the signal strength being below a desired threshold and output a subsequent selection signal indicative thereof. The signal strength may, for example, be determined from channel quality measurements between the device 200/200' and the network, the received signal strength at the antenna arrays 250 and 250', and/or the received bit error rate. The switches 255 and 255' may be configured to further alter the configuration of the antenna arrays 250 and 250', respectively, responsive to the subsequent selection signal. For example, if antenna performance for the preferred radio access technology is not improved above an acceptable threshold responsive to reconfiguring the antenna arrays 250 and/or 250', the detector/selector circuit 225 may select a different one of the available ones of the radio access technologies and activate the switches 255 and 255' to reconfigure the antenna arrays 250 and 250' accordingly.

Although FIGS. 1 and 2A-2B illustrate example wireless communication devices including reconfigurable antenna arrays according to some embodiments of the present invention, it will be understood that the present invention is not limited to such configurations but is intended to encompass any configuration capable of carrying out operations described herein. For example, while illustrated with reference to switching circuits 255 and 255' including single pole, double throw switches, other switching elements, such as transistor-based switches, may also be used in the switching circuits 255 and/or 255'. Also, although illustrated as a grounded state in FIG. 2A and an open state in FIG. 2B by way of example, it will be understood that embodiments of the present invention may include other means for switching an antenna element to an inactive state. In addition, while illustrated as being internal to the wireless communication devices 200 and 200', it will be understood that the antenna arrays 250 and/or 250' may be external to or provided on an external surface of the wireless communication devices 200 and/or 200' in some embodiments. More generally, although illustrated with reference to specific blocks having specific functions, it is to be understood that the functionality of these blocks may be combined, divided, and/or eliminated.

Figure 3:
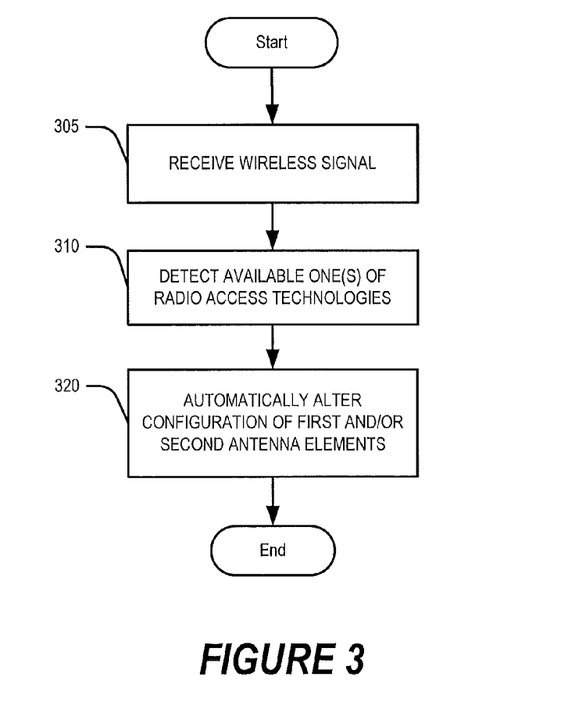
FIGS. 3-5 are flowcharts illustrating methods for operating an antenna system in a wireless communication device configured for communication using multiple radio access technologies according to some embodiments of the present invention.

FIG. 3 is a flowchart illustrating methods for operating an antenna system in a wireless communication device configured for communication using multiple radio access technologies according to some embodiments of the present invention. The operations illustrated in FIG. 3 may be performed by the processor 127 of FIG. 1 and/or the control circuit 227/227' of FIGS. 2A/2B in some embodiments. Referring now to FIG. 3, a wireless signal is received at an antenna array including at least two antenna elements at Block 305. Based on the received wireless signal, an available one of the radio access technologies usable by the wireless communication device is detected at Block 310. For example, the wireless communication device may be compatible with 2G, 3G, and 4G cellular wireless standards, and may be configured to detect and use the 4G wireless standard for communication when available. Responsive to detection of the available radio access technology, a configuration of the first and/or second antenna elements is automatically altered at Block 320 to improve performance of the antenna array for the available one of the radio access technologies. In particular, the first and/or second antenna elements may be selectively connected to and/or disconnected from a transceiver of the wireless communication device to increase an efficiency of the antenna array for the available one of the radio access technologies. The operations of FIG. 3 may be repeated periodically, intermittently, and/or responsive to receiving additional wireless signals to thereby adaptively adjust the configuration of the antenna array to provide improved and/or optimal performance for the available radio access technologies.

Figure 4:
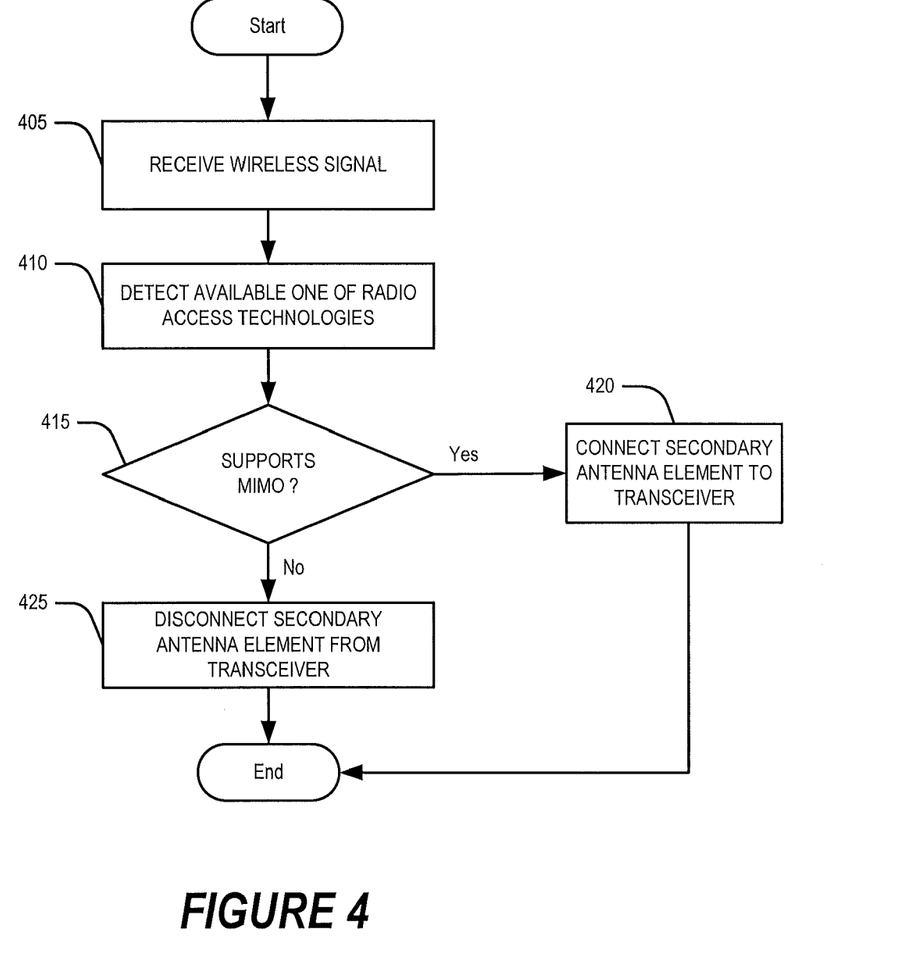

FIG. 4 is a flowchart illustrating methods for operating an antenna system in a wireless communication device according to some embodiments of the present invention in greater detail. The operations illustrated in FIG. 4 may be performed by the processor 127 of FIG. 1 and/or the control circuit 227/227' of FIGS. 2A/2B in some embodiments. Referring now to FIG. 4, a wireless signal is received at an antenna array including a primary antenna element and a secondary antenna element at Block 405, and an available one of the radio access technologies usable by the wireless communication device is detected at Block 410. At Block 415, it is determined whether the available one of the radio access technologies supports multiple-input and multiple-output (MIMO) technology, and if so, the secondary antenna element is automatically connected to the transceiver at Block 420. For example, the available one of the radio access technologies may be a 3G transitional technology (such as LTE or HSPA+) or a 4G technology (such as LTE-Advanced) that supports MIMO, such that both the primary and secondary antenna elements may be usable for communication simultaneously. As such, the performance and/or efficiency of the antenna array may be increased for the available radio access technology.

However, if it is determined at Block 415 that the available one of the radio access technologies does not support MIMO, the secondary antenna element is automatically disconnected from the transceiver at Block 425. For example, when the available one of the radio access technologies is a 3G technology (such as UMTS or GSM) that cannot use both the primary and secondary antenna elements for communication simultaneously, the secondary antenna element may be switched to an open-circuit or may be connected to a ground plane of a printed circuit board, thereby reducing mutual coupling-related losses. As such, the efficiency of the antenna array may be increased by automatically disconnecting the secondary antenna element from the transceiver when the secondary antenna element is not usable with the available radio access technology.

Figure 5:
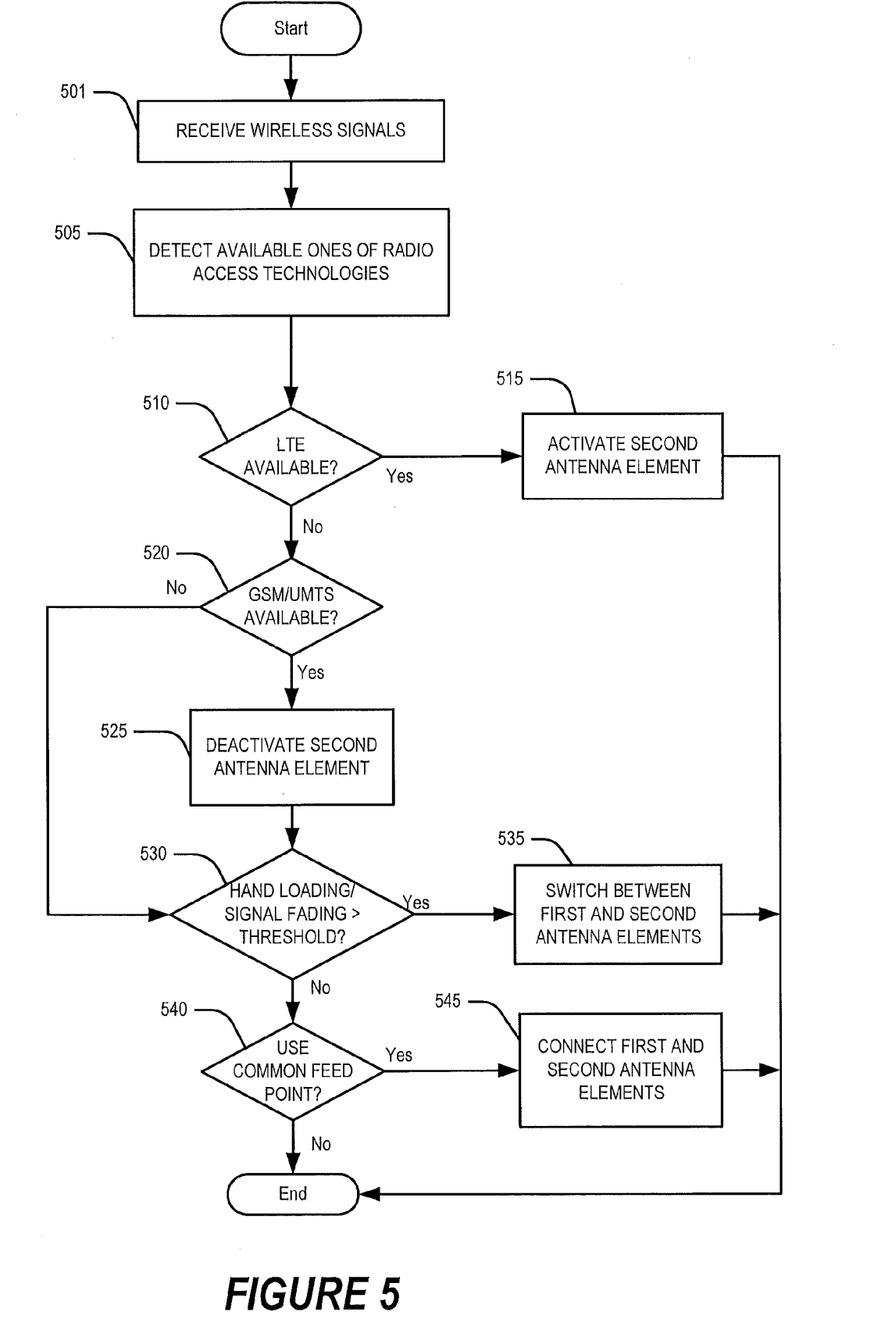

FIG. 5 is a flowchart illustrating methods for operating an antenna system in a wireless communication device according to some embodiments of the present invention in further detail. The operations illustrated in FIG. 5 may be performed by the processor 127 of FIG. 1 and/or the control circuit 227/227' of FIGS. 2A/2B in some embodiments. Referring now to FIG. 5, one or more wireless signals are received at an antenna array including first and second antenna elements at Block 501 and available one(s) of the radio access technologies that are usable by the wireless communication device are detected at Block 505. For example, the wireless communication device may be configured for communication using multiple radio access technologies, and may be configured to detect a number of available ones of the radio access technologies in a particular area based on the wireless signals received at the antenna array. The wireless communication device may also be configured to select one of the available radio access technologies based, for example, on which of the available radio access technologies provides the highest spectral efficiency. In particular, at Block 510, it is determined whether LTE (which supports MIMO) is one of the available radio access technologies, and if so, LTE is selected and the second antenna element is activated at Block 515. In some embodiments, a decoupling and matching circuit may be used to connect the second antenna element to a transceiver to further improve MIMO performance. As such, the second antenna element may be selectively connected to the transceiver to increase the efficiency of the antenna array for LTE communications.

However, it should be noted that activating the second antenna element may reduce the efficiency of the antenna array for radio access technologies that do not support MIMO. For example, in handheld or other portable wireless communication devices, the use of multiple antenna elements may reduce the single antenna efficiency by about 1 dB to about 3 dB due to strong mutual coupling between the multiple antenna elements. In other words, the improved performance for the selected radio access technology may come at the expense of performance for another available radio access technology.

However, if it is determined that LTE is not available at Block 510, it is determined whether GSM or UMTS are among the available radio access technologies at Block 520. If so, GSM or UMTS is selected and the second antenna element is deactivated at Block 525, as neither support MIMO. In particular, the second antenna element may be disconnected from the transceiver (for example, by switching the second antenna element to an open mode or grounded state), thereby reducing mutual coupling losses and improving antenna efficiency. If it is determined that GSM or UMTS are not available at Block 520, another radio access technology may be selected for communication, if any are available.

Also, the configuration of the antenna array may be further altered to improve reception of the antenna array. In particular, at Block 530, it is determined whether hand loading and/or signal fading exceeds a predetermined acceptable threshold at the first and/or second antenna elements. If so, diversity reception is provided by switching between the first and second antenna elements at Block 535, depending on which exhibits less loading and/or fading. For example, responsive to detection of hand loading and/or signal fading at the first antenna element in excess of the threshold, the second antenna element may be reconnected to the transceiver and the first antenna element may be disconnected from the transceiver. If the hand loading and/or signal fading is below the threshold, it is determined whether a common feed point can be used to improve antenna efficiency for the selected radio access technology at Block 540. If so, the first and second antenna elements are connected to a common feed point at Block 545. Accordingly, power may be distributed to both the first and second antenna elements to control near-field radiation, for example, to meet requirements for hearing aid compatibility (HAC) and/or SAR, and/or to reduce hand effects, thereby improving antenna efficiency.

The flowcharts of FIGS. 3-5 illustrate the architecture, functionality, and operations of embodiments of hardware and/or software according to various embodiments of the present invention. It will be understood that each block of the flowchart and/or block diagram illustrations, and combinations of blocks in the flowchart and/or block diagram illustrations, may be implemented by computer program instructions and/or hardware operations. In this regard, each block represents a module, segment, or portion of code, which comprises one or more executable instructions for implementing the specified logical function(s). It should be noted that, in other implementations, the function(s) noted in the blocks may occur out of the order noted in FIGS. 3-5. For example, two blocks shown in succession may, in fact, be executed substantially concurrently, or the blocks may sometimes be executed in the reverse order, depending on the functionality involved.

The computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks. The computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Accordingly, embodiments of the present invention provide a smart antenna array including two or more antenna elements that can be automatically switched between active and inactive states to provide respective configurations compatible with different radio access technologies responsive to detection of the available radio access technologies. In contrast, conventional antenna arrays may be configured to switch between active antenna elements to improve reception for a particular radio access technology responsive to signal degradation.

In the drawings and specification, there have been disclosed typical embodiments of the invention and, although specific terms are employed, they are used in a generic and descriptive sense only and not for purposes of limitation, the scope of the invention being set forth in the following claims.

That which is claimed:
1. A wireless communication device, comprising:
a transceiver configured for communication using multiple radio access technologies, the transceiver comprising a transmitter and a receiver;
an antenna array coupled to the transceiver, the antenna array including a first fixed antenna element and a second fixed antenna element; and
a control circuit configured to detect an available one of the radio access technologies based on a wireless signal received at the antenna array and to automatically alter a configuration of the antenna array by switching the first and/or second antenna elements between active and inactive states responsive to detection of the available one of the radio access technologies, wherein the control circuit comprises:

a detector circuit configured to detect the available one of the radio access technologies based on the received wireless signal and output a selection signal indicative thereof; and a switching circuit configured to selectively connect the first and/or second antenna elements to the transceiver responsive to the selection signal to increase an efficiency of the antenna array for the available one of the radio access technologies, wherein the switching circuit is configured to automatically disconnect the second antenna element from the transceiver to increase the efficiency of the antenna array responsive to detection of the available one of the radio access technologies as not supporting multiple-output (MIMO).

2. The device of claim 1, wherein the switching circuit is further operable to automatically switch the second antenna element to an open state responsive to detection of the available one of the radio access technologies as not being configured to support MIMO.

3. The device of claim 1, wherein the switching circuit is further operable to automatically switch the second antenna element to a grounded state responsive to detection of the available one of the radio access technologies as not being configured to support MIMO.

4. The device of claim 1, wherein the available one of the radio access technologies comprises Global Standard for Mobile (GSM) and/or Universal Mobile Telecommunications System (UMTS).

5. The device of claim 1, wherein the switching circuit is configured to automatically disconnect one of the first and second antenna elements from the transceiver and connect the other of the first and second antenna elements to the transceiver responsive to detection of hand loading and/or signal fading at the one of the first and second antenna elements.

6. The device of claim 1, wherein the switching circuit is configured to automatically connect the first and second antenna elements to a common feed point to increase the efficiency of the antenna array responsive to detection of the available one of the radio access technologies as not supporting multiple-input multiple-output (MIMO).

7. The device of claim 1, wherein the switching circuit is configured to automatically connect each of the first and second antenna elements to the transceiver responsive to detection of the available one of the radio access technologies as supporting multiple-input multiple-output (MIMO).

8. The device of claim 7, further comprising:
a decoupling and matching circuit;
wherein the switching circuit is configured to automatically connect the second antenna element to the transceiver via the decoupling and matching circuit responsive to detection of the available one of the radio access technologies as being a Long-Term Evolution (LTE)-compatible technology.

9. The device of claim 1, wherein the detector circuit is configured to detect multiple available ones of the radio access technologies based on respective wireless signals received at the antenna array, wherein the detector circuit further comprises:
a selector circuit operable to select one of the available ones of the radio access technologies and output the selection signal indicative thereof,
wherein the switching circuit is operable to selectively connect the first and/or second antenna elements to the transceiver responsive to the selection signal to increase the efficiency of the antenna array for the selected one of the available ones of the radio access technologies and to reduce an efficiency of the antenna array for another of the available ones of the radio access technologies.

10. The device of claim 9, wherein a first one of the respective wireless signals corresponding to the selected one of the available ones of the radio access technologies comprises a weaker signal than a second one of the respective wireless signals.

11. The device of claim 1, wherein the first and second antenna elements are mounted at opposite sides of the wireless communication device.

12. The device of claim 1, wherein the first and second antenna elements are mounted on a same side of the wireless communication device with a gap therebetween.

13. A wireless communication device, comprising:
a transceiver configured for communication using multiple radio access technologies, the transceiver comprising a transmitter and a receiver;
an antenna array coupled to the transceiver, the antenna array including a first fixed antenna element and a second fixed antenna element; and
a control circuit configured to detect multiple available ones of the radio access technologies based on respective wireless signals received at the antenna array and configured to automatically alter a configuration of the antenna array by switching the first and/or second antenna elements between active and inactive states responsive to detection of the multiple available ones of the radio access technologies, wherein the control circuit comprises:
a detector circuit configured to detect the multiple available ones of the radio access technologies based on the received wireless signals, wherein the detector circuit further comprises a selector circuit configured to select one of the available ones of the radio access technologies and output a selection signal indicative thereof; and
a switching circuit configured to selectively connect the first and/or second antenna elements to the transceiver responsive to the selection signal to increase an efficiency of the antenna array for the selected one of the available ones of the radio access technologies and to reduce an efficiency of the antenna array for another of the available ones of the radio access technologies,
wherein a first one of the respective wireless signals corresponding to the selected one of the available ones of the radio access technologies comprises a weaker signal than a second one of the respective wireless signals, and wherein:
the detector circuit is further configured to detect a subsequent signal strength of the first one of the respective wireless signals responsive to selectively connecting the first and/or second antenna elements to the transceiver;
the selector circuit is configured to select a different one of the available ones of the radio access technologies responsive to the signal strength being below a desired threshold and output a subsequent selection signal indicative thereof; and
the switching circuit is configured to further alter the configuration of the antenna array responsive to the subsequent selection signal to increase an efficiency of the antenna array for the different one of the available ones of the radio access technologies.

14. A method of operating an antenna system for communication using multiple radio access technologies, the method comprising:

receiving, at an antenna array including a plurality of antenna elements, a wireless communication signal, wherein the plurality of antenna elements comprises first and second fixed antenna elements;

detecting an available one of the radio access technologies responsive to receiving the wireless communication signal at the antenna array; and automatically altering a configuration of the antenna array by switching at least one of the plurality of antenna elements between active and inactive states responsive to detecting the available one of the radio access technologies, wherein detecting and automatically altering comprises:
providing a selection signal indicative of the available one of the radio access technologies responsive to detection thereof, and
selectively connecting the first and/or second antenna elements to a wireless transceiver configured for communication using the multiple radio access technologies responsive to the selection signal to increase an efficiency of the antenna array for the available one of the radio access technologies, wherein selectively connecting the first and/or second antenna elements comprises:
automatically disconnecting the second antenna element from the transceiver to increase the efficiency of the antenna array responsive to detecting the available one of the radio access technologies as not supporting multiple-output (MIMO).

15. The method of claim 14, further comprising:
detecting hand loading and/or signal fading at one of the first and second antenna elements; and
automatically disconnecting one of the first and second antenna elements from the transceiver and connecting the other of the first and second antenna elements to the transceiver responsive to detection of the hand loading and/or signal fading at the one of the first and second antenna elements.

16. The method of claim 14, wherein selectively connecting the first and/or second antenna elements comprises:
automatically connecting each of the first and second antenna elements to the transceiver responsive to detecting the available one of the radio access technologies as supporting multiple-input multiple-output (MIMO).

17. A method of operating an antenna system for communication using multiple radio access technologies, the method comprising:
receiving, at an antenna array including a plurality of antenna elements, a wireless communication signal, wherein the plurality of antenna elements comprises first and second fixed antenna elements;

detecting an available one of the radio access technologies responsive to receiving the wireless communication signal at the antenna array; and automatically altering a configuration of the antenna array by switching at least one of the plurality of antenna elements between active and inactive states responsive to detecting the available one of the radio access technologies, wherein detecting and automatically altering comprises:
providing a selection signal indicative of the available one of the radio access technologies responsive to detection thereof, and
selectively connecting the first and/or second antenna elements to a wireless transceiver configured for communication using the multiple radio access technologies responsive to the selection signal to increase an efficiency of the antenna array for the available one of the radio access technologies, wherein selectively connecting the first and/or second antenna elements comprises:
automatically connecting the first and second antenna elements to a common feed point to increase the efficiency of the antenna array responsive to detecting the available one of the radio access technologies as not supporting multiple-input multiple-output (MIMO).

18. A method of operating an antenna system for communication using multiple radio access technologies, the method comprising:
receiving, at an antenna array including a plurality of antenna elements, a wireless communication signal;
detecting an available one of the radio access technologies responsive to receiving the wireless communication signal at the antenna array; and
automatically altering a configuration of the antenna array by switching at least one of the plurality of antenna elements between active and inactive states responsive to detecting the available one of the radio access technologies,
wherein the available one of the radio access technologies comprises a first available one of the radio access technologies, and further comprising:
detecting a subsequent signal strength of the wireless communication signal responsive to automatically altering the configuration of the antenna array;
detecting a second available one of the radio access technologies responsive to the subsequent signal strength being below a desired threshold and outputting a subsequent selection signal indicative thereof; and
further altering the configuration of the antenna array by switching the at least one of the antenna elements between the active and inactive states responsive to the subsequent selection signal to increase an efficiency of the antenna array for the second available one of the radio access technologies.

* * * * *

UNITED STATES PATENT AND TRADEMARK OFFICE
CERTIFICATE OF CORRECTION

PATENT NO. : 8,351,849 B2  
APPLICATION NO. : 12/861324  
DATED : January 8, 2013  
INVENTOR(S) : Ying Page 1 of 1

It is certified that error appears in the above-identified patent and that said Letters Patent is hereby corrected as shown below:

In the Claims:

Column 15, Claim 1, Line 14:
    Please correct "as not supporting multiple-output"
        to read -- as not supporting multiple-input multiple-output --

Column 17, Claim 14, Line 30:
    Please correct "multiple-output (MIMO)."
        to read -- multiple-input multiple-output (MIMO). --

Signed and Sealed this
Twenty-third Day of April, 2013

Teresa Stanek Rea
*Acting Director of the United States Patent and Trademark Office*